United States Patent [19]
Göttling et al.

[11] Patent Number: 5,168,898
[45] Date of Patent: Dec. 8, 1992

[54] VALVE APPARATUS

[75] Inventors: Helmut Göttling, Isernhagen; Reinhard Mauentöbben, Hannover; Rudolf Möller; Gerhard Scharnowski, both of Gehrden, all of Fed. Rep. of Germany

[73] Assignee: Mannesmann Aktiengesellschaft, Düsseldorf, Fed. Rep. of Germany

[21] Appl. No.: 716,556

[22] Filed: Jun. 17, 1991

[30] Foreign Application Priority Data

Jun. 15, 1990 [DE] Fed. Rep. of Germany ....... 4019073

[51] Int. Cl.$^5$ .............. F16K 1/44; F16K 31/06
[52] U.S. Cl. ................. 137/625.34; 251/129.07; 251/129.08
[58] Field of Search .............. 137/625.34; 251/129.07, 251/129.08

[56] References Cited

U.S. PATENT DOCUMENTS

| 13,128 | 6/1855 | Harris | 137/625.34 |
|---|---|---|---|
| 1,892,883 | 1/1933 | Goldkamp | 137/625.34 X |
| 2,001,534 | 5/1935 | Hughes | 137/625.34 X |
| 2,014,968 | 9/1935 | Hughes | 137/625.34 X |
| 2,731,036 | 1/1956 | Hughes | 137/625.34 |
| 3,012,583 | 12/1961 | Gorgens et al. | 137/625.34 |
| 4,313,590 | 2/1982 | Nishimiya | 251/129.08 |
| 4,314,585 | 2/1982 | Nishimiya et al. | 137/625.34 |
| 4,450,866 | 5/1984 | Grimm et al. | 137/625.34 |
| 4,915,134 | 4/1990 | Toliusis et al. | 251/129.07 X |
| 4,971,115 | 11/1990 | Tinholt | 137/625.27 X |

FOREIGN PATENT DOCUMENTS

| 160224 | 3/1941 | Fed. Rep. of Germany . |
|---|---|---|
| 1252027 | 10/1967 | Fed. Rep. of Germany . |
| 1990632 | 5/1968 | Fed. Rep. of Germany . |
| 2934181 | 4/1989 | Fed. Rep. of Germany . |
| 112467 | 8/1980 | Japan ............................ 251/129.07 |
| 59-6478 | 1/1984 | Japan ............................ 251/129.07 |

Primary Examiner—Gerald A. Michalsky
Attorney, Agent, or Firm—Nils H. Ljungman and Associates

[57] ABSTRACT

A valve apparatus which contains two valve bodies oriented behind one another on a tappet. The first valve body, together with a first valve seat, forms a first valve and the second valve body, together with a second valve seat, forms a second valve. With two valve bodies rigidly connected to one another, it is possible, such as on account of manufacturing tolerances, that when the two valves are closed, one of the two valve bodies will not seat exactly on its corresponding valve seat, which means that leaks can occur. The present invention provides for at least one of the two valve seats or at least one of the two valve bodies being adjustable in the direction of the longitudinal axis of the tappet in relation either to the other valve seat or in relation to the other valve body to change the distance between the two valve seats or to change the distance between the two valve bodies.

3 Claims, 2 Drawing Sheets

VALVE APPARATUS

BACKGROUND OF THE INVENTION

1. Field of the Invention

This invention relates to a valve apparatus, in particular to a proportionally-acting electromagnetic valve, in accordance with aspects of the invention to be discussed below.

2. Background Information

German Patent No. 29 34 181 essentially discloses a valve apparatus such as that to which the present invention generally relates. In the valve apparatus disclosed therein, a valve housing contains a first valve seat which, together with a first valve body, forms a first valve, and a second valve seat which, together with a second valve body, forms a second valve. The first and second valves are located coaxially behind one another. The first valve body and the second valve body are located on a tappet which is used for the joint activation of both valves.

For the first valve, there is a first pressure medium inlet chamber, and for the second valve there is a second pressure medium inlet chamber. Additionally, there is a pressure medium outlet chamber, which can be connected simultaneously by means of the first valve and the second valve to the first pressure medium inlet chamber and the second pressure medium inlet chamber, or can be shut off from them.

As a result of the configuration of two pressure medium inlet chambers, which can be connected simultaneously by means of both valves to the pressure medium output chamber, it is generally possible to release large flow cross sections with small movements of the valve bodies. However, a disadvantage with this known configuration, in which two valve bodies are rigidly connected to one another, may be found in that it is possible that one of the two valve bodies may not be seated exactly on its corresponding valve seat, possibly, for example, on account of manufacturing tolerances. As a result, leaks may occur.

OBJECT OF THE INVENTION

The object of the invention is, therefore, to create a valve apparatus of the type described above, in which it is guaranteed that when both valves are closed, the two valve bodies will be seated precisely, with substantially no gaps, on their corresponding valve seats.

SUMMARY OF THE INVENTION

This object is achieved by means of the invention disclosed hereinbelow. Refinements and advantageous configurations of the invention are also disclosed hereinbelow.

The present invention has the particular advantage that, as a result of the ability to change the distance between the valve seats of the two valves, and the distance between the two valve bodies, it becomes possible to usually guarantee a tight seating of the valve bodies on their corresponding valve seats. In accordance with an advantageous refinement of the valve apparatus according to the invention, the tappet supporting the valve bodies is preferably guided on its two opposite ends in the housing or in parts of the housing.

In summary, one aspect of the invention resides broadly in an electromagnetic valve comprising: a housing; a first valve and a second valve both being disposed within said housing; means for opening said first valve and said second valve; said first valve comprising a first valve seat and a first valve body, wherein said first valve body is positionable against said first valve seat for closing said first valve; said second valve comprising a second valve seat and a second valve body, wherein said second valve body is positionable against said second valve seat for closing said second valve; said opening means comprising means for displacing said first valve body and said second valve body; and means for adjusting the position of at least one of: said first valve seat relative to said second valve seat; and said second valve seat relative to said first valve seat.

Another aspect of the invention resides broadly in an electromagnetic valve comprising: a housing; a first valve and a second valve both being disposed within said housing; means for opening said first valve and said second valve; said first valve comprising a first valve seat and a first valve body, wherein said first valve body is positionable against said first valve seat for closing said first valve; said second valve comprising a second valve seat and a second valve body, wherein said second valve body is positionable against said second valve seat for closing said second valve; said opening means comprising means for displacing said first valve body and said second valve body; and means for adjusting the position of at least one of: said first valve body relative to said second valve body; and said second valve body relative to said first valve body.

Yet another aspect of the invention resides broadly in an electromagnetic valve comprising: a housing; a first valve and a second valve both being disposed within said housing; means for opening said first valve and said second valve; said first valve comprising a first valve seat and a first valve body, wherein said first valve body is positionable against said first valve seat for closing said first valve; said second valve comprising a second valve seat and a second valve body, wherein said second valve body is positionable against said second valve seat for closing said second valve; said opening means comprising means for displacing said first valve body and said second valve body; said opening means comprising a first portion and a second portion, wherein said first valve body is disposed on said first portion of said opening means and said second valve body is disposed on said second portion of said opening means; means for connecting said first and second portions of said opening means; and said connecting means comprising means for adjusting the position of at least one of: said first portion of said opening means relative to said second portion of said opening means; and said second portion of said opening means relative to said first portion of said opening means to thereby adjust the position of at least one of: said first valve body relative to said second valve body; and said second valve body relative to said first valve body.

BRIEF DESCRIPTION OF THE DRAWINGS

The accompanying drawings illustrate two embodiments of the invention, which are explained below in greater detail.

DESCRIPTION OF THE PREFERRED EMBODIMENTS

Figure 1:
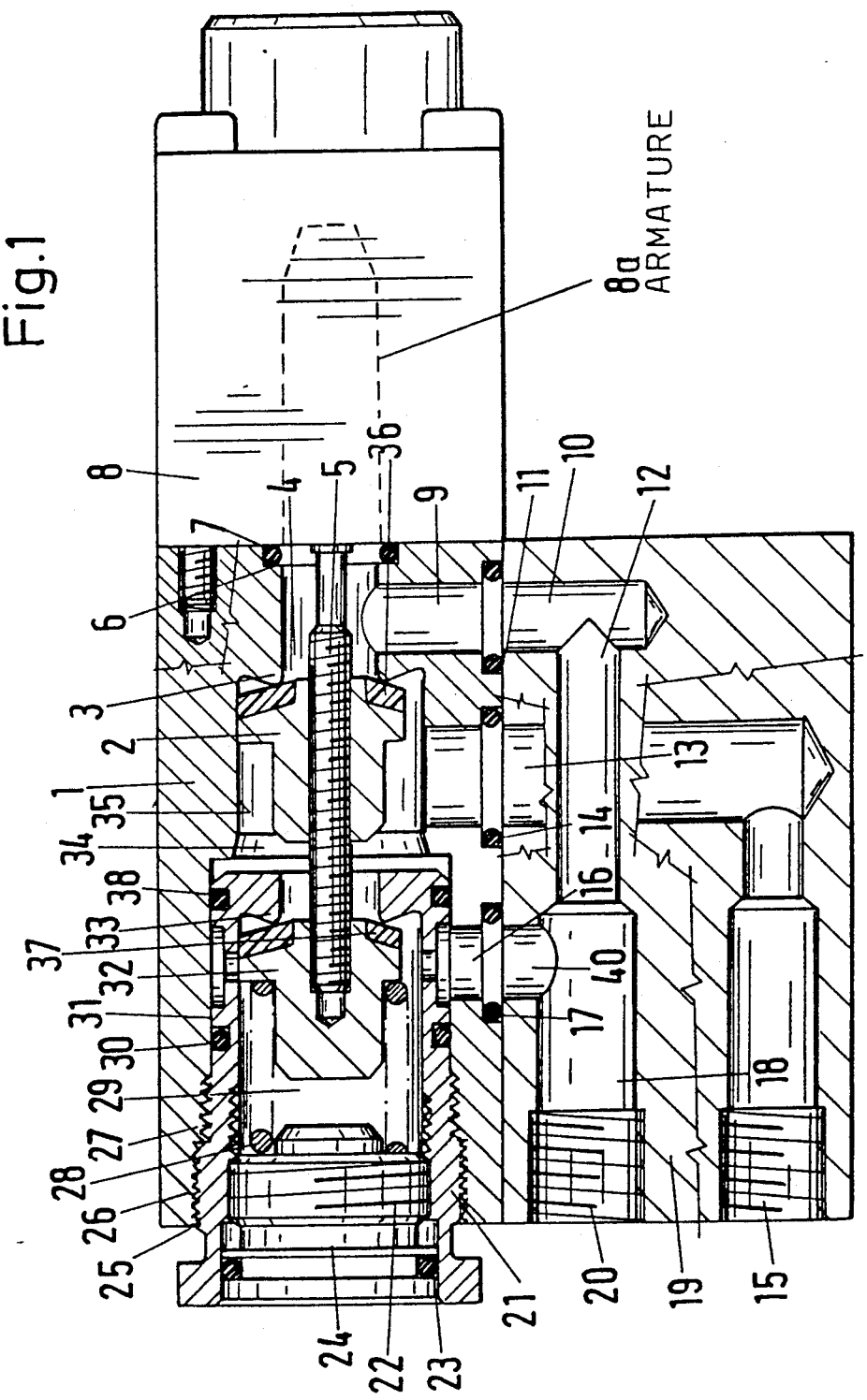
FIG. 1 shows a valve apparatus configured as a proportional electromagnetic valve, in which one of the two valve seats can be adjusted in the direction of the tappet supporting the valve bodies.

FIG. 1 shows a valve housing 1 which has a graduated housing recess, shown as 27, 31 and 35, generally running in the direction of the longitudinal axis of the housing 1. A graduation of the housing recess 27, 31, 35 running in a slightly diagonal direction in relation to the longitudinal axis of the valve housing 1 and extending toward the inside of the housing recess 27, 31, 35, is preferably designed as a first valve seat 3 permanently fastened to be integrated with the housing 1. Together with a first valve body 36, 2, this first valve seat 3 preferably forms a first valve 3, 36, 2. As an example, the first valve body 36, 2 may comprise a metal support 2 and an elastic gasket 36 located on the support.

In the housing recess 27, 31, 35, in an area 27, 31 having a generally larger diameter, there is preferably disposed a housing insert designed as a tubular body 21. Preferably, by means of an external thread 26 on the circumference of the tubular body 21 and an internal thread 25 on an exposed terminal area of the housing recess 27, 31, 35, the tubular body 21 is connected to the valve housing 1 in the manner of a screw connection.

On the end opposite its end projecting out of the housing recess 27, 31, 35, the tubular body 21 preferably has a projection running at a slight angle in relation to the longitudinal axis of the valve housing 1 and toward the inside of the housing recess 27, 31, 35. The projection is preferably designed as a second valve seat 33. The second valve seat 33, together with a valve body 37, 32, preferably forms a second valve 33, 37, 32. The second valve body 37, 32 may also comprise a support 32 made of metal and an elastic gasket 37 located on the support 32.

Preferably, the first valve body 36, 2 and the second valve body 37, 32 are, essentially, rigidly connected to one another by means of a tappet 5 serving as an activation means for the two valves 3, 36, 2 and 33, 37, 32. The first valve seat 3 and the second valve seat 33, as well as the first valve body 36, 2 and the second valve body 37, 32, are preferably located behind one another in a coaxial orientation. The tubular body 21 is preferably sealed against a wall adjoining the housing recess 27, 31, 35 by means of gaskets 30, 38 located on the circumference of the tubular body.

Preferably, in the exposed terminal area of the tubular body 21, a sealing cap 24 is screwed in. The sealing cap 24 preferably has an extension 22 extending toward the second valve body 37, 32. Also, the sealing piece 24 preferably has a gasket 23 on its circumference, wherein the gasket is in sealed contact with the inside wall of the tubular body 21. A spring 28, acting as a control spring, is preferably braced against the extension 22 of the sealing cap 24. The spring 28 is preferably configured such that it exerts a force on the second valve body 37, 32, and, consequently, also indirectly on the first valve body 36, 2, being that the first valve body 36, 2 is essentially rigidly connected by mean of the tappet 5 to the second valve body 37, 32. The spring force is generally exerted in the closing direction of the second valve 33, 37, 32 and the first valve 3, 36, 2.

Preferably, on the side of the first valve body 36, 2 facing away from the second valve body 37, 32, there is a first pressure medium inlet chamber 4, and on the side of the second valve body 37, 32 facing away from the first valve body 36, 2, there is a second pressure medium inlet chamber 29. Additionally, between the first valve 3, 36, 2 and the second valve 33, 37, 32, there is preferably a pressure medium outlet chamber 34. When the first valve 3, 36, 2 and the second valve 33, 37, 32 are activated, in the opening direction, essentially simultaneously, the pressure medium outlet chamber 34 can consequently be connected with the first pressure medium inlet chamber 4 and to the second pressure medium inlet chamber 29. As noted above, the first valve seat 3 and the second valve seat 33 are essentially located coaxially behind one other in a coaxial orientation.

Preferably, the first pressure medium inlet chamber 4 has a pressure medium connection 9 and the second pressure medium inlet chamber 29 has a pressure medium connection 16. The pressure medium outlet chamber 34 is preferably connected to a consumer (not shown) by means of a pressure medium outlet 13, with the interposition of a gasket 14, via a passage 15 connected to outlet 13. Preferably, passage 15 is located in a housing cover 19. Finally, a pressure medium line (not shown) is preferably connected to the passage 15. The pressure medium connection 9 of the first pressure medium inlet chamber 4 and the pressure medium connection 16 of the second pressure medium inlet chamber 29 may be connected to a pressure medium source (not shown) by means of pressure medium passages 18, 12, 10, 40 in the housing cover 19 and a pressure medium connection 20 connected to these passages.

The housing cover 19 is preferably screwed to the valve housing 1 by means of screws (not shown). The pressure medium connections 9 and 16 in the valve housing 1 are preferably connected, with the interposition of gaskets 11 and 17, to the passages 10 and 40 in the housing cover 19. In this way, essentially no pressure medium may escape to the atmosphere through any possible gap between the wall of the valve housing 1 and the wall of the housing cover 19. Preferably, the housing cover 19 is located not on an end surface of the valve housing 1, but on the external longitudinal surface of valve housing 1, and is preferably oriented in a direction substantially parallel to the longitudinal axis of the valve housing 1.

An electromagnet 8, preferably designed as a proportional magnet, is preferably fastened by means of screws on the surface of the end of valve housing 1 generally opposite the sealing cap 24 of the tubular body. An armature 8a of the electromagnet 8 is preferably disposed in a coaxial relationship relative to the tappet 5 supporting the two valve bodies 36, 2 and 37, 32, and is also preferably connected to the tappet 5. Preferably, a graduation 6 of housing 1 is located adjacent the housing recess 27, 31, 35 and faces the electromagnet 8. A gasket 7 is preferably in contact with a graduation 6 and seals the electromagnet 8 from the inside of the valve housing 1, substantially filling any possible gap between the valve housing 1 and the housing of the electromagnet 8.

The operation of the valve apparatus described above is explained in greater detail hereinbelow.

In normal operation, pressure medium is preferably delivered from the pressure medium source via the pressure medium chambers 18, 40, 12, 10 in the housing cover 19. The pressure medium connections 9 and 16 connected to chambers 18, 40, 12 and 10 then essentially further deliver the pressure medium into the first pressure medium inlet chamber 4 and into the second pressure medium inlet chamber 29. At this point, the first valve 3, 36, 2 and the second valve 33, 37, 32 are each generally in their closed position. If a specified voltage or a specified current is applied to the electromagnet 8, the armature 8a and the tappet 5 connected thereto, supporting the valve bodies 36, 2 and 37, 32, are moved in the opening direction of the first valve 3, 36, 2 and the second valve 33, 37, 32, against the force of the control spring 28.

Preferably, as a function of the force of the control spring and as a function of the voltage and/or current applied to the electromagnet 8, the first valve 3, 36, 2 and the second valve 33, 37, 32 are moved into an open position. Preferably, the resultant opening cross section of the two valves 3, 36, 2 and 33, 37, 32 is a function of the conditions noted immediately above. From the first pressure medium inlet chamber 4 and the second pressure medium inlet chamber 29, pressure medium then essentially flows through the open valves 3, 36, 2 and 33, 37, 32 into the pressure medium outlet chamber 34. Then, the pressure medium generally flows from outlet chamber 34, via the pressure medium outlet 13 and the passage 15, to a consumer (not shown).

If the applied voltage or the current is again removed from the electromagnet 8, the two valves 3, 36, 2 and 33, 37, 32 will then tend to move back into the closed position under the force exerted by the control spring 28. At that point, the pressure medium outlet chamber 34 is essentially shut off from the first pressure medium inlet chamber 4 and the second pressure medium inlet chamber 29. By means of the sealing cap 24 and of the extension 22 located thereupon, a prestress may be applied to the control spring 28. In other words, positional adjustment of the sealing part and/or the extension 22 may allow for the application of a prestress on the control spring 28.

The present invention is particularly advantageous in situations wherein, when the valves are closed, the first valve body 36, 2 or the second valve body 37, 32 does not sit absolutely tightly on its corresponding seat 3 or 33, and, thus, essentially causes the appearance of gaps. Thus, in spite of both valves 3, 36, 2 and 33, 37, 32 being in the closed position, there may be a leakage of pressure medium from the pressure medium outlet 13 of the valve apparatus. To remedy such situations, the tubular body 21 supporting the second valve seat 33 may be rotated around its longitudinal axis until a distance is effected between the first valve seat 3 and the second valve seat 33 guaranteeing that the first valve body 36, 2 sits on its corresponding valve seat 3 and the second valve body 37, 32 sits on its corresponding valve seat 33 essentially without any gaps.

The distance between the first valve seat 3 and the second valve seat 33 can thus be changed, in the direction of the longitudinal axis of the valve housing 1 and of the tappet 5, as a result of the adjustability of the second valve seat 33. The adjustability of the valve seat 33 is permitted by the presence of a screw connection between the tubular body 21 and the valve housing 1, wherein there is an external thread 26 on the tubular body 21 and an internal thread on the inner wall of the valve housing 1 adjacent to the housing recess 27, 31, 35. Since, in a preferred embodiment of the present invention, the tubular body 21 having the second valve seat 33 projects, to some extent, with its exposed end out of the housing recess 27, 31, 35 of the valve housing 1, no special tools are usually needed to adjust the second valve seat 33.

Of course, it may be possible, instead of having a tubular body, to have only a ring-shaped body designed as a valve seat, such that the ring-shaped body may be screwed directly into the housing recess. In such a configuration, the major portion of the inner wall of the valve housing 1, adjacent to the housing recess, naturally, should generally be equipped with an internal thread. It may also be possible to configure the first valve seat in a manner similar to the configuration of the second valve seat. In such a case, naturally, the area of the valve housing 1 in which the first valve seat is to be located should also generally be configured like the area in which the second valve seat 33 is located.

Figure 2:
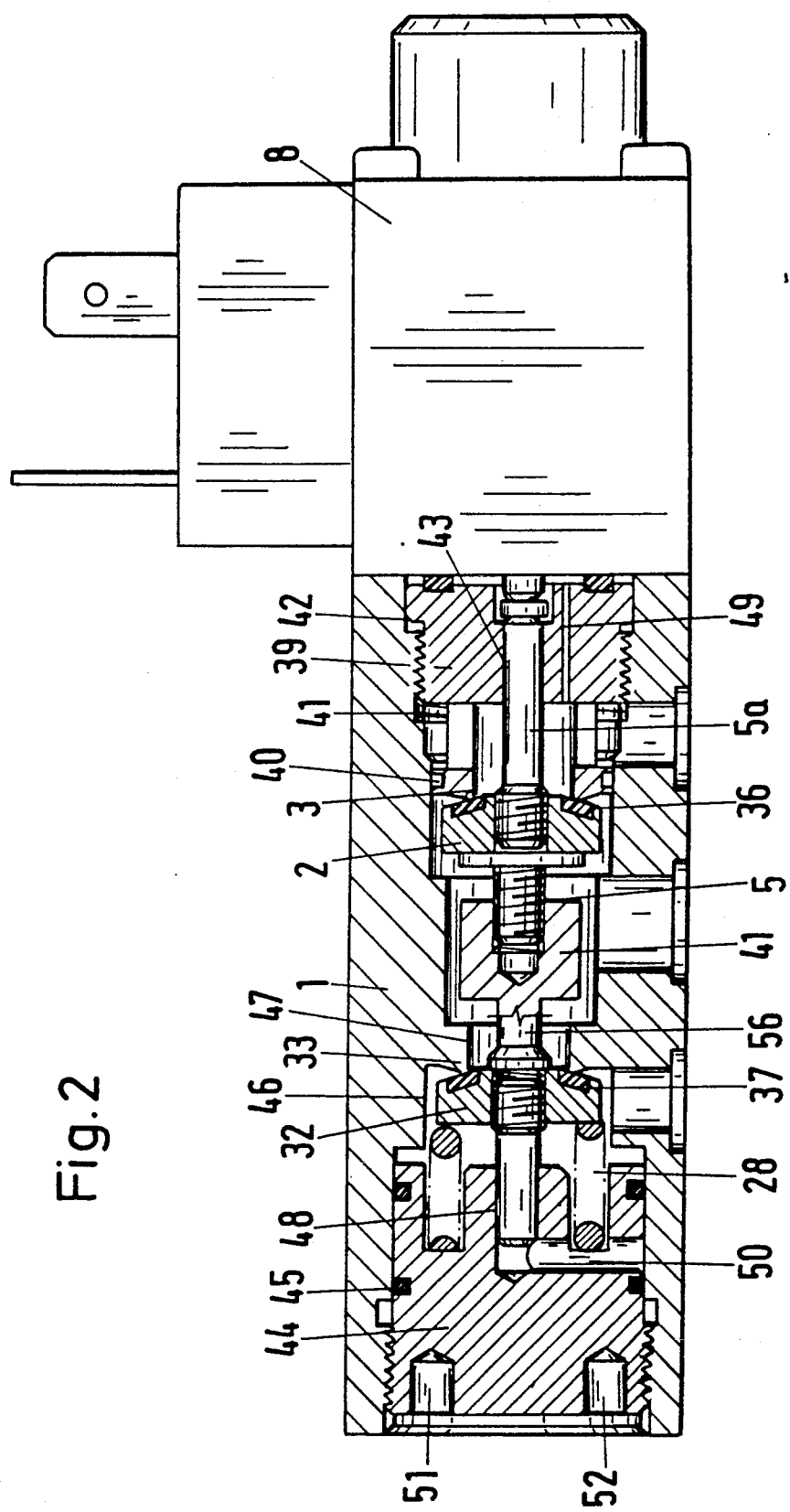
FIG. 2 shows a valve apparatus essentially similar to the valve apparatus illustrated in FIG. 1, but in which the tappet supporting the two valve bodies is divided in the area between the two valve bodies, and the two parts of the tappet are connected to one another by means of a nut.

FIG. 2 shows a valve apparatus which has essentially the same construction as the valve apparatus illustrated in FIG. 1. For the sake of simplicity, the housing cover 19 with the passages has been omitted in the drawing illustrating this embodiment. Since, in this embodiment, the adjustment apparatus for the two valves generally differs fundamentally from the adjustment apparatus illustrated in FIG. 1 and since there is a guide for the tappet, the following description generally relates only to the special adjustment apparatus for the valves and to the guidance for the tappet. For purposes of clarity, the components in FIG. 2 generally similar to corresponding components illustrated in FIG. 1 are identified by similar reference numerals.

In the graduated recess in the valve housing 1, a first valve seat 3 and a second valve seat 33 are preferably located behind one another in a relative coaxial orientation. The first valve seat 3 is preferably located on a housing insert 39 screwed into a graduated recess hole 40, 41, 42 of the valve housing 1 on the side of the valve housing 1 facing toward the electromagnet 8. The second valve seat 33 is preferably permanently fastened to the housing and integrated therewith. Preferably, a first valve body 36, 2, together with the first valve seat 3, form a first valve 36, 3, 2, and a second valve body 37, 32, together with the second valve seat 33, form a second valve 33, 37, 32.

The first valve body 36, 2 and the second valve body 37, 32 are preferably connected to one another by means of a tappet 5, which tappet 5 is for activating both valve bodies. Essentially, the tappet 5 is divided at right angles to its longitudinal axis in an area between the first valve body 36, 2 and the second valve body 37, 32. Thus, a first part 5a of the tappet supports the first valve body 36, 2 and a second part 5b of the tappet 5 supports the second valve body 37, 32. Both the part 5a of the tappet 5 and the part 5b of the tappet 5 preferably have threads on their mutually engaged extremities. The threads are not illustrated in any further detail in the drawing.

The threaded portions of the parts 5a and 5b of the tappet 5 are preferably connected to one another by a nut 41 used as a connecting means for the two parts of the tappet. Preferably, the nut 41 is a part of the tappet part 5b. Tappet part 5a is preferably provided with threads to engage with the nut 41. The distance between the first valve body 36, 2 and the second valve body 37, 32 may thus be changed by rotating the nut 41, in relation to the tappet part 5a, around the longitudinal axis of the tappet part 5a, or by rotating at least one of the two tappet parts 5a or 5b around their respective longitudinal axes. It may also be possible to omit the division of the tappet 5 into parts 5a and 5b and to screw only at least one of the two valve bodies 36, 2 or 37, 32 onto the tappet 5. For example, the tappet 5 may include external threads and either or both of the valve bodies 36, 2 and 37, 32 may include internal threads so that either or both of the valve bodies 36, 2 and 37, 32 may be screwed onto the tappet 5. Thus, by rotating at least one of the valve bodies 36, 2 or 37, 32 around its longitudinal axis, the distance between the two valve bodies 36, 2 and 37, 32 may be changed as a function of the pitch of thread used.

The same effect is essentially achieved with all the discussed embodiments, particularly on account of the adjustment capability afforded in that at least one of the two valve seats 3 or 33 may be moved in relation to the other valve seat 33 or 3 and in that at least one of the two valve bodies 36, 2 or 37, 32 may be adjusted in relation to the other valve body 37, 32 or 36, 2 in the direction of the longitudinal axis of the tappet. As a result, the distance between the two valve seats 3 and 33 or between the two valve bodies 37, 32 and 36, 2 may be changed and each of the two valve bodies 36, 2 and 37, 32 can be brought into a substantially gap-free contact with its corresponding valve seat 3 or 33.

To further improve the substantially gap-free seating of the valve bodies on their corresponding valve seats, the tappet 5a is preferably disposed such that its free end, that is, the end closer to electromagnet 8, is mounted in a passage 43 in the housing insert 39. In this way, the housing insert 39 may act as a guide for the tappet 5, so that the tappet 5 can slide in the direction of its longitudinal axis. For the same purpose, there is a recess 48 preferably provided to serve as a guide for the tappet 5. The recess 48 may be located in an additional housing insert or, also, in a housing insert 44 configured to close a graduated housing hole 45, 46, 47 in the valve housing 1. Thus, part 5b of the tappet 5 is essentially mounted in this recess 48 so that it can move in the direction of its longitudinal axis. Preferably, this housing insert or closing part 44 is located on the side of the valve housing 1 opposite the other housing insert 39.

To prevent the formation of dynamic pressure in the terminal regions of the guides 43 and 48 holding the tappet 5, passages 49 and 50 are preferably provided in the housing inserts 39 and 44, respectively. In the housing insert 44, against which the spring 28 is preferably braced, recesses 51 and 52 are preferably provided for the introduction or insertion of a tool thereinto. By utilizing recesses 51 and 52 for the insertion of an appropriate tool, the externally threaded housing insert 44 may be rotated about its longitudinal axis to thereby adjust the housing insert 44 in the direction of its longitudinal axis and, thus, to adjust the force of the spring 28. Of course, the tappet 5 may also be guided in at least one portion permanently fastened to the housing. The guide for the tappet 5 can, of course, also be used in a valve apparatus whose tappet is not configured in a divided manner.

One feature of the invention resides broadly in a valve apparatus, in particular a proportionally acting electromagnetic valve, with the following features: a first valve seat 3 which, together with a first valve body 36, 2, forms a first valve 3, 36, 2, and a second valve seat 33 which, together with a second valve body 37, 32, forms a second valve 33, 37, 32, are located coaxially one behind the other in a valve housing 1; the first valve body 36, 2 and the second valve body 37, 32 are located on a tappet 5 which is used for the joint activation of both valves 3, 36, 2 and 33, 37, 32; corresponding to the first valve 3, 36, 2 there is a first pressure medium inlet chamber 4, and corresponding to the second valve 33, 37, 32 there is a second pressure medium inlet chamber 29; there is a pressure medium outlet chamber 34, which can be connected simultaneously via the first valve 3, 36, 2 and the second valve 33, 37, 32 to the first pressure medium inlet chamber 4 and to the second pressure medium inlet chamber 29, or can be cut off from them; characterized by the fact that at least one of the two valve seats 3 or 33 can be adjusted in the direction of the longitudinal axis of the tappet 5 in relation to the other valve seat 33 or 3, to change the distance between the two valve seats 3 and 33.

Another feature of the invention resides broadly in a valve apparatus, in particular a proportionally acting electromagnetic valve, with the following features: a first valve seat 3 which, together with a first valve body 36, 2, forms a first valve 3, 36, 2, and a second valve seat 33 which, together with a second valve body 37, 32, forms a second valve 33, 37, 32, are located coaxially one behind the other in a valve housing 1; the first valve body 36, 2 and the second valve body 37, 32 are located on a tappet 5 which is used for the joint activation of both valves 3, 36, 2 and 33, 37, 32; corresponding to the first valve 3, 36, 2 there is a first pressure medium inlet chamber 4, and corresponding to the second valve 33, 37, 32 there is a second pressure medium inlet chamber 29; there is a pressure medium outlet chamber 34, which can be connected simultaneously via the first valve 3, 36, 2 and the second valve 33, 37, 32 to the first pressure medium inlet chamber 4 and to the second pressure medium inlet chamber 29, or can be cut off from them; characterized by the fact that at least one of the two valve bodies 36, 2 or 37, 32 can be adjusted in the direction of the longitudinal axis of the tappet 5 in relation to the other valve body 37, 32 or 36, 2, to change the distance between the two valve bodies 37, 32 or 36, 2.

Yet another feature of the invention resides broadly in a valve apparatus, in particular a proportionally acting electromagnetic valve, with the following features: a first valve seat 3 which, together with a first valve body 36, 2, forms a first valve 3, 36, 2, and a second valve seat 33 which, together with a second valve body 37, 32, forms a second valve 33, 37, 32, are located coaxially one behind the other in a valve housing 1; the first valve body 36, 2 and the second valve body 37, 32 are located on a tappet 5 which is used for the joint activation of both valves 3, 36, 2 and 33, 37, 32; corresponding to the first valve 3, 36, 2 there is a first pressure medium inlet chamber 4, and corresponding to the second valve 33, 37, 32 there is a second pressure medium inlet chamber 29; there is a pressure medium outlet chamber 34, which can be connected simultaneously via the first valve 3, 36, 2 and the second valve 33, 37, 32 to the first pressure medium inlet chamber 4 and to the second pressure medium inlet chamber 29, or can be cut off from them; characterized by the following features: the tappet 5 is divided in the area between the first valve body 36, 2 and the second valve body 37, 32 into a part 5a and a part 5b; there are connection means for the two parts 5a and 5b; the two parts 5a, and 5b can be moved relative to one another in the direction of their longitudinal axis by activating the connection means, to change the distance between the two valve bodies 36, 2 and 37, 32.

A further feature of the invention resides broadly in a valve apparatus characterized by the following features: a nut 41 is used as the connection means for the two parts 5a and 5b of the tappet 5; there are threads on the facing terminal areas of the two parts 5a and 5b of the tappet 5.

A yet further feature of the invention resides broadly in a valve apparatus characterized by the fact that an electromagnet 8 which is actively connected to the tappet 5 is used to drive the tappet 5.

A still further feature of the invention resides broadly in a valve apparatus characterized by the fact that the electromagnet 8 is designed as a proportional magnet.

A still yet further feature of the invention resides broadly in a valve apparatus characterized by the fact that the tappet 5 or a part connected to the tappet 5 is acted on by a spring 28 in opposition to the force exerted by the electromagnet 8 on the tappet 5.

A yet another feature of the invention resides broadly in a valve apparatus characterized by the fact that the spring 28 is designed as a control spring.

A still yet another feature of the invention resides broadly in a valve apparatus characterized by the fact that at least one of the two valve seats 3 or 33 is located on a housing insert 21, which is removably fastened in a housing recess 27, 31 running in the direction of the longitudinal axis of the tappet 5, and which can be adjusted in the direction of its longitudinal axis in the housing recess 27, 31.

A yet still further feature of the invention resides broadly in a valve apparatus characterized by the fact that for the removable and adjustable fastening of the housing insert 21, there is an external thread 26 on the housing insert 21, and an internal thread 25 interacting with it and located in the wall adjacent to the housing recess 27, 31.

A still yet further feature of the invention resides broadly in a valve apparatus characterized by the fact that at least one of the two valve bodies 36, 2 or 37, 32 is screwed onto the tappet 5.

A still yet another feature of the invention resides broadly in a valve apparatus characterized by the fact that the tappet 5 is guided in the direction of its longitudinal axis by means of at least one of its exposed terminal regions in a recess 48 or in a hole 32 in a part 44 or 39 of the valve housing 1 which serves as a guide for the tappet 5.

A yet further feature of the invention resides broadly in a valve apparatus characterized by the fact that the guide 48 or 43 for the tappet 5 is located in a sealing cap or in a housing insert 44 or 39 of the valve housing 1.

An example of a proportional type electromagnetic valve, having components which may be utilized with the embodiments of the present invention, may be found in U.S. Pat. No. 4,314,585, entitled "Proportional Type Electromagnetic Valve", which issued on Aug. 22, 1979. This U.S. Patent corresponds to Federal Republic of Germany Patent No. 29 34 181.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A proportional electromagnetic valve comprising:
a housing;
a first valve and a second valve both being disposed within said housing;
means for opening said first valve and said second valve;
said first valve comprising a first valve seat and a first valve body, wherein said first valve body is positionable against said first valve seat for closing said first valve;
said second valve comprising a second valve seat and a second valve body, wherein said second valve body is positionable against said second valve seat for closing said second valve;
said first valve seat and said second valve seat being the sole valve seats in said electromagnetic valve;
said opening means comprising means for displacing said first valve body and said second valve body;
means for adjusting the position of at least one of:
said first valve seat relative to said second valve seat; and
said second valve seat relative to said first valve seat;
said opening means comprising:
tappet means, wherein said first valve body and said second valve body are coaxially disposed on said tappet means;
electromagnetic means for displacing said tappet means;
means for connecting said electromagnetic means and said tappet means; and
said electromagnetic means comprising a proportional magnet;
said first valve and said second valve being connected in series;
said opening means being common means for simultaneously opening said first valve and said second valve; and
said opening means comprising means for simultaneously displacing said first valve body and said second valve body.

2. The electromagnetic valve according to claim 1, wherein said electromagnetic valve has a central axis thereof oriented in a substantially longitudinal direction with respect to said electromagnetic valve, said electromagnetic valve further comprising:
at least one housing recess being disposed within said housing;
at least one housing insert being disposed within at least one of said at least one housing recess;
at least one of said first valve seat and said second valve seat being disposed within at least one of said at least one housing insert;
said adjusting means additionally being for adjusting the position of at least one of said at least one housing insert for thereby adjusting the position of at least one of:
said first valve seat relative to said second valve seat; and
said second valve seat relative to said first valve seat;

each of said at least one housing recess having an inner peripheral surface oriented generally towards the central axis of said electromagnetic valve;

at least one of said at least one housing recess comprising an internal thread disposed about the inner peripheral surface of said at least one of said at least one housing recess;

each of said at least one housing insert comprising an external peripheral surface oriented generally away from the central axis of said electromagnetic valve;

at least one of said at least one housing insert comprising an external thread disposed about the external peripheral surface of said at least one of said at least one housing insert;

said external thread of said at least one of said at least one housing insert being engaged with said internal thread of said at least one of said at least one housing recess; and said means for adjusting at least one of:
  said first valve seat relative to said second valve seat; and
  said second valve seat relative to said first valve seat
comprising said internal thread of said at least one of said at least one housing recess and said external thread of said at least one of said at least one housing insert.

3. The electromagnetic valve according to claim 2, further comprising:

said electromagnetic means for applying an opening force to said tappet means to open said first valve and said second valve;

biasing means for biasing said tappet means against the opening force of said electromagnetic means; and said biasing means being a control spring.

* * * * *